(12) United States Patent
Oukassi et al.

(10) Patent No.: US 9,535,306 B2
(45) Date of Patent: Jan. 3, 2017

(54) ELECTROCHROMIC DEVICE

(71) Applicant: COMMISSARIAT A L'ENERGIE ATOMIQUE ET AUX ENERGIES ALTERNATIVES, Paris (FR)

(72) Inventors: Sami Oukassi, Saint Egreve (FR); Philippe Pantigny, Claix (FR); Raphaël Salot, Lans en Vercors (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/858,372

(22) Filed: Sep. 18, 2015

(65) Prior Publication Data

US 2016/0085126 A1    Mar. 24, 2016

(30) Foreign Application Priority Data

Sep. 22, 2014    (FR) .................................... 14 58902

(51) Int. Cl.
*G02F 1/153*    (2006.01)
*G02F 1/15*    (2006.01)
(Continued)

(52) U.S. Cl.
CPC .............. *G02F 1/155* (2013.01); *G02F 1/1506* (2013.01); *G02F 1/1525* (2013.01); *G02F 1/163* (2013.01);
(Continued)

(58) Field of Classification Search
CPC ........ G02F 1/15; G02F 1/1506; G02F 1/1508; G02F 1/1525; G02F 1/155; G02F 1/157; G02F 1/163; G02F 1/19; G02F 2001/1515; G02F 2001/1519; G02F 2001/1555; G02F 1/153; G02F 1/1523; G02F 1/13439; G02F 2001/1552; B60R 1/088; C09K 9/00
(Continued)

(56) References Cited

U.S. PATENT DOCUMENTS 5,206,756 A *  4/1993  Cheshire ............... G02F 1/1525
                                                    252/62.2
6,301,039 B1 * 10/2001  Tench .................... G02F 1/1506
                                                    359/266
(Continued)

FOREIGN PATENT DOCUMENTS

WO    WO-2014/134120 A1    9/2014

OTHER PUBLICATIONS

International Search Report and Written Opinion issued in French Pat. Appl. No. 1458902 dated Apr. 22, 2015.

*Primary Examiner* — Loha Ben
(74) *Attorney, Agent, or Firm* — Marshall, Gerstein & Borun LLP

(57) ABSTRACT

An electrochromic device includes a stack successively including: a first current collector, an electrochromic electrode made of a material capable of reversibly inserting metal ions, an electrolyte, a second current collector, a reflective substrate contacting the first current collector or with the second current collector. It includes a single electrochromic electrode and has at least the two following functional states: a first absorbing functional state, induced by the application of a first electric voltage between the two current collectors, wherein the device includes metal ions reversibly inserted into the material of the electrochromic electrode; and a second reflective functional state subsequent to the application of a second electric voltage between the two current collectors, wherein a metal layer is formed between the electrolyte and the second current collector, this metal layer including at least part of the metal ions initially (Continued)

reversibly inserted into the material of the electrochromic electrode.

15 Claims, 1 Drawing Sheet

(51) Int. Cl.
  *G02F 1/155* (2006.01)
  *G02F 1/163* (2006.01)
  *B60R 1/08* (2006.01)
  *C09K 9/00* (2006.01)

(52) U.S. Cl.
  CPC .............. *B60R 1/088* (2013.01); *C09K 9/00* (2013.01); *G02F 1/1508* (2013.01); *G02F 2001/1515* (2013.01); *G02F 2001/1519* (2013.01); *G02F 2001/1555* (2013.01)

(58) Field of Classification Search
  USPC .................. 359/265, 267, 269–273, 275
  See application file for complete search history.

(56) References Cited

U.S. PATENT DOCUMENTS

| | | | | |
|---|---|---|---|---|
| 6,400,491 | B1* | 6/2002 | Tench | G02F 1/1506 359/267 |
| 7,042,615 | B2* | 5/2006 | Richardson | G02F 1/19 359/265 |
| 7,317,566 | B2* | 1/2008 | Tench | G02F 1/1506 204/290.14 |
| 7,646,526 | B1* | 1/2010 | Wang | C03C 17/06 345/105 |
| 8,284,473 | B2* | 10/2012 | Reynolds | G02F 1/15 359/273 |
| 8,773,747 | B2* | 7/2014 | Ferreira | G02F 1/1533 359/269 |
| 2016/0011482 | A1* | 1/2016 | Danine | B60R 1/088 359/268 |

* cited by examiner

ELECTROCHROMIC DEVICE

CROSS-REFERENCE TO RELATED APPLICATION

This application claims the benefit of priority under 35 U.S.C. §119 of French patent application no. 1458902, filed Sep. 22, 2014, the entire contents of which is hereby incorporated herein by reference for all purposes.

TECHNOLOGICAL FIELD

The present disclosure relates to an electrochromic device containing a single electrochromic electrode comprising a material capable of inserting and of deinserting metal ions.

The field of use of the presently described apparatus especially relates to thermal management by radiation in the aerospace field, and more particularly optical radiators of satellites.

BACKGROUND

A conventional electrochromic device enables to modify the optical transmittance, reflectance, or absorbance properties of an electromagnetic radiation. Such a modulation is obtained by means of an active electrochromic electrode, which allows a reversible change of optical state when an electric voltage is applied across the electrochromic device.

This type of device comprises a stack formed of the following elements:
a first current collector;
a first electrochromic electrode;
an electrolyte;
a second electrochromic electrode;
a second current collector; and
a support.

The current collectors are used as terminals enabling to connect the device to an external electric voltage source.

Further, at least one of the electrodes is optically active. It enables to modulate the optical properties of an electromagnetic radiation by passing from a colored state to a transparent state. Such a change of optical state results from the insertion or from the deinsertion of ions into or from the material forming the electrochromic electrode when an electric voltage is applied across the device.

The second electrode may also be optically active, but with a reverse ion flow, or passive, that is, transparent whatever the ion flow. It is necessary in known structures to provide the storage of metal ions which migrate from the first electrochromic electrode.

The electrolyte is an electronic insulator but an ion conductor. It enables to ensure the ion migration between the two electrodes.

The performance of an electrochromic device especially depends on the contrast, that is, on the difference between the maximum and the minimum optical response of the device. A high-performance device generally has a high contrast.

Even though prior art devices generally enable to obtain a satisfactory contrast, they undergo optical losses due to the absorption of the materials used and to the reflection phenomenon at the level of the substrate/current collector/electrochromic electrode/electrolyte/electrochromic electrode/current collector interfaces.

A solution enabling to limit optical losses, and thus to obtain a better contrast, comprises placing the active electrochromic electrode at the front surface of the device, that is, in direct contact with the electromagnetic radiation.

However, since the number of optical interfaces remains unchanged, such devices do not do away with optical losses induced by the interfaces. Further, such devices may also raise problems of cyclability in time as the cation insertion/deinsertion cycles are repeated. Document U.S. Pat. No. 7,042,615 describes a device of this type.

The present disclosure relates to an electrochromic device enabling to solve these technical problems, and especially to improve the contrast by decreasing optical losses.

SUMMARY OF THE DISCLOSURE

The presently described apparatus enables to decrease optical losses in an electrochromic device, especially by suppressing one electrochromic layer and the two interfaces induced by this electrochromic layer.

In embodiments, an electrochromic device includes a stack including (i) a first current collector, (ii) an electrochormic electrode made of a material capable of reversibly inserting metal ions, (iii) an electrolyte, and (iv) a second current collector. The electrochromic device also includes a reflective substrate in contact with the second current collector, wherein it comprises a single electrochromic electrode and has at least two functional states. The at least two functional states include (i) a first absorbing functional state, induced by the application of a first electric voltage between the two current collectors, wherein the device comprises metal ions reversibly inserted into the material of the electrochromic electrode, and (ii) a second reflective functional state, subsequent to the application of a second electric voltage between the two current collectors, wherein a metal layer is formed between the electrolyte and the second current collector. The metal layer in the second reflective functional state includes at least part of the metal ions initial reversibly inserted into the material of the electrochromic electrode.

The disclosed improvements and the resulting advantages will better appear from the following description, non-limiting drawings, and examples, provided as an illustration.

DETAILED DESCRIPTION

Figure 1:
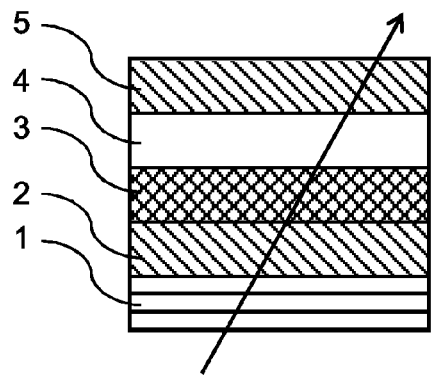
FIG. 1 illustrates an electrochromic device in its first functional state.

The presently described apparatus relates to an electrochromic device comprising a single electrochromic diode allowing the insertion and the deinsertion of metal ions. It is provided with a second complementary electrochromic electrode enabling to store the metal once deinserted from the first electrochromic electrode.

Heat exchanges in space are limited to radiation phenomena. The device according to the present disclosure enables to manage radiative exchanges occurring at the level of the walls of a spacecraft, particularly a satellite. Thus, the electrochromic device according to the disclosure is particularly adapted in satellite thermal management applications.

This electrochromic device comprises a stack of layers deposited on a substrate. It operates by ion exchange inducing the forming of an electrodeposit on the surface of a current collector.

More specifically, the present disclosure relates to an electrochromic device comprising:
a stack successively comprising:
(a) a first current collector;
(b) an electrochromic electrode made of a material capable of reversibly inserting metal ions;
(c) an electrolyte; and
(d) a second current collector, and
a reflective substrate in contact with the first current collector or with the second current collector.

According to the disclosure, the electrochromic device comprises a single electrochromic electrode and has at least the two following functional states:
a first absorbing functional state, induced by the application of a first electric voltage between the two current collectors, wherein the device comprises metal ions reversibly inserted into the material of the electrochromic electrode; and
a second reflective functional state subsequent to the application of a second electric voltage between the two current collectors, wherein a metal layer is formed between the electrolyte and the second current collector, this metal layer comprising at least part of the metal ions initially reversibly inserted into the material of the electrochromic electrode.

These two functional states correspond to a reflective state and to an absorbing state, particularly at wavelengths in the range from 0.2 to 2 micrometers.

The first functional state corresponds to the absence of electrodeposition while the second functional state corresponds to the state of forming of an electrodeposit by the metal ions, for example, Li+ ions.

Generally, a reflective material corresponds to a material having low transmittance and absorption properties as compared with the reflectance component.

Conversely, an absorbing material corresponds to a material having high transmittance and absorption properties as compared with the reflectance component.

The substrate being reflective, the first electrode, the electrolyte, and the current collectors of the electrochromic device are advantageously transparent.

The metal layer results from the electrodeposition of at least part of the metal ions initially inserted into the material of the electrochromic electrode.

In the first functional state, the stacking of the device is successively formed of:
(a) a first current collector;
(b) an electrochromic electrode having its material reversibly inserting metal ions;
(c) an electrolyte; and
(d) a second current collector.

However, in the second functional state, the device stack is successively formed of:
(a) a first current collector;
(b) an electrochromic electrode having its material reversibly inserting metal ions;
(c) an electrolyte;
(d) a metal layer formed by at least part of the metal ions initially inserted into the material of the electrochromic electrode; and
(e) a second current collector.

The second current collector may have a surface of contact with the electrolyte, having its surface state selected so that the metal layer formed at the interface between the electrolyte and the second current collector is reflective or absorbing.

To obtain a reflective metal layer, said surface is advantageously smooth. However, to obtain an absorbing metal layer, said surface is advantageously rough or textured.

According to a specific embodiment relative to the second functional state, the metal layer is formed by all the metal (metal ions) initially inserted into the material of the electrochromic electrode.

The metal layer has a thickness advantageously in the range from 10 to 1,000 nanometers, more advantageously from 100 to 500 nanometers.

As already specified, it is obtained by electrodeposition on application of an electric field across the electrochromic device, by migration of the metal (metal ion deinsertion) in the form of ions from the single electrochromic electrode. It enables to modulate an electromagnetic radiation, particularly by reflection.

Generally, the variation of the metal ion insertion rate in an electrochromic material goes along with a variation of the voltage of the system having the electrochromic material integrated therein. In the case of the device according to the present disclosure, the voltages applied to obtain the first and second functional states are the voltages representative of the targeted insertion rates of the system.

For example, if U1 is the voltage applied to substantially insert all the metal ions into the electrochromic electrode (state 1=first functional state), and U2 is the voltage applied to electrodeposit substantially all the metal ions (state 2=second functional state), a multitude of intermediate states may be obtained by application of a voltage in the range from U1 to U2.

Thus, the electrochromic device may have intermediate functional states between the first and second functional states, by the application of appropriate intermediate voltages between the first and second electric voltages.

In the case of lithium ions $Li^+$ for example, the voltage applied to extract ions from the electrochromic electrode and form an electrodeposit is always greater than the voltage applied to dissociate the electrodeposit and inject back the metal ions into the electrochromic electrode.

For example: the reversible insertion of lithium ions into tungsten oxide $WO_3$ occurs in potential window [2.2 V, 3.5 V], with 2.2 V for the fully lithiated state, and 3.5 V for the fully delithiated state. For this specific example, the application of a voltage greater than the voltage of the lithiated state causes the beginning of an electrodeposition.

Beyond, the application of a higher voltage enables to increase the thickness of the electrodeposited layer and thus to modulate the reflection (proportional to the thickness of the metal layer). The application of a voltage close to or higher than the voltage of the fully delithiated state generates the forming of an electrodeposit with all the metal ions initially available in the electrochromic electrode.

The metal ions initially inserted into the material of the electrochromic electrode are advantageously selected from the group comprising alkaline metal ions such as lithium ion and sodium ions; magnesium ions; silver ions; and mixtures thereof.

The metal ions are advantageously introduced during the deposition of the electrochromic electrode. The quantity of metal (metal ions) depends on the ability of the electrochromic electrode material to insert it. It depends on the thickness of the electrochromic electrode.

The deinsertion of metal ions from the material of the electrochromic electrode is obtained by application of an electric voltage between the device terminals (first and second current collectors). This results in the progressive forming of the metal layer corresponding to the second functional state or to an intermediate functional state.

The metal insertion into the material of the electrochromic electrode is obtained by application of a reverse electric voltage between the device terminals. This results in the progressive disappearing of the metal layer, and in the return of the device to its initial optical state corresponding to the first functional state.

The current collectors, the electrolyte, the electrochromic electrode, and the substrate of the electrochromic device may be made of transparent materials, that is, of materials letting through the electromagnetic radiation to which the electrochromic device is exposed. This electromagnetic radiation may correspond to the ultraviolet-visible and/or infrared spectral range, from 0.2 to 20 micrometers.

According to a specific embodiment, only the substrate is not transparent. In this case, the front surface of the device exposed to electromagnetic radiation is opposite to the substrate, which is reflective.

As already indicated, the only electrochromic electrode of the device is made of a material capable of storing a metal (metal ions) and of releasing it by insertion/deinsertion.

It may be an optically-active electrode, that is, an electrode allowing an optical modulation such as a change of color on insertion or extraction of a metal. In this case, it may advantageously be made of a material capable of being selected from the group comprising tungsten oxide $WO_3$; titanium oxides $TiO_x$; tantalum oxides $TaO_x$; molybdenum oxides $MoO_x$; and niobium oxides $NbO_x$; and mixtures thereof. It advantageously is $WO_3$.

It may be also an optically passive electrode, that is, an electrode having a neutral optical state on insertion and extraction of a metal. In this case, it may advantageously be made of a material which may be selected from the group comprising vanadium oxide $V_2O_5$; $CeVO_4$; $CeO_2$; $CeO_2$—$SiO_2$; and mixtures thereof. It advantageously is $V_2O_5$.

According to a specific embodiment, the electrochromic electrode may comprise a mixture of the above-mentioned materials.

The thickness of the electrochromic electrode is advantageously in the range from 50 to 1,000 nanometers, more advantageously from 100 to 500 nanometers.

As an example, it may be in the order of 400 nanometers for an optically active electrode, particularly made of $WO_3$. It may be in the order of 200 nanometers for an optically passive electrode, particularly made of $V_2O_5$.

Advantageously, the materials forming the first and the second current collectors may be, independently from each other, selected from the group comprising: aluminum zinc oxide (AZO); electrically-conductive transparent oxides; indium tin oxide (ITO); and metals inert with respect to the involved metal ions, such as copper, aluminum, tungsten, molybdenum, titanium, or nickel, particularly in the case of lithium or sodium ions.

The thickness of the current collectors is advantageously in the range from 2 to 1,000 nanometers, more advantageously from 5 to 500 nanometers, more advantageously still from 5 to 200 nanometers. The thickness of the first current collector may be different from that of the second current collector.

As an example, the first current collector may be made of transparent conductive oxide, such as ITO, and may have a thickness in the order of 200 nanometers, while the second current collector may be made of a metal inert with respect to the involved metal ions and may have a thickness smaller than 20 nanometers.

Independently from each other, the current collectors may be in the form of a homogeneous layer, or of a structured layer.

The second current collector is advantageously structured, that is, it has a roughness or texturing of the surface in contact with the electrolyte.

To obtain such a structuring, it is for example possible to carry out a step of partial plasma etching on the electrolyte before depositing the second current collector. In certain conditions, the plasma may generate a surface roughness of the electrolyte which will be used as a structuring for the second current collector.

The growth of a metal film on a smooth surface induces the forming of a smooth layer having the aspect of a reflective mirror. However, the growth of a metal film on a structured surface causes the forming of an absorbing layer, the absorption being depending on the structuring of the considered surface. Thus, when the second current collector is structured, the electrodeposit (metal layer) is of absorbing nature.

The electrochromic device also comprises an electrolyte which is advantageously made of a material which may be selected from the group comprising lithium phosphorus oxynitride (LiPON); $LiNbO_3$; $LiAlF_4$; $Li_3N$ (lithium nitride); LZTO (lanthanum zinc tin oxide); LAGP (lithium aluminum germanium phosphate); LiSiPON (lithium silicon phosphorus oxynitride); LiBON (lithium boron oxynitride); LiSON (lithium sulfur oxynitride); NASICON (sodium Super Ionic CONductor); AgI; and $Rb_xAg_yI_z$.

The thickness of the electrolyte is advantageously in the range from 0.2 to 2 micrometers, more advantageously from 0.2 to 1 micrometer, and more advantageously still from 0.2 to 0.5 micrometer.

As already indicated, the substrate of the electrochromic device is reflective. It is advantageously and at least partially made of a material which may be selected from the group comprising glass; sapphire; ZnS; ZnSe; silicon; germanium; polymer materials such as, in particular, Kapton® (imide-based polymer), PET (poly(ethylene terephthalate)), PEN (polyethylene naphthalate); mica (ore from the silicate group mainly comprising aluminum potassium silicate); aluminum; carbon; and ceramic. According to a specific embodiment, the substrate is integrally made of one of these materials.

The substrate may be formed of a stack of one or a plurality of materials. At least the surface of the substrate which has a reflective optical function is formed by at least one of the previous materials.

According to a specific embodiment, the substrate may be made of an electrically-conductive material. In this case, the device may have no current collector in contact with the substrate. The substrate made of electrically-conductive material then plays the role of first or second current collector.

The substrate thickness is advantageously in the range from 20 to 1,000 micrometers, more advantageously from 50 to 200 micrometers.

According to a specific embodiment, the substrate is made of optically reflective material, and in contact with the first current collector.

Thus, the metal layer is formed by electrodeposition to directly interact with the radiation to which the device is exposed. The position of the metal layer enables to redirect the radiation before it reaches the reflective material substrate.

Further, the metal layer may be of transparent (absorbing state) or reflective nature according to its thickness and to the surface state of the second current collector. It is thus possible to modulate the transmission and reflection properties of the metal layer according to the targeted applications.

This optical modulation resulting from the forming of the metal layer is gradual, given that it depends on the migration of the metal in the form of metal ions, from the electrochromic electrode to the second current collector having the metal layer deposited thereon, or from the metal layer to the electrochromic electrode.

It also depends on the initial quantity of metal (metal ions) reversibly inserted into the material of the electrochromic electrode in the absence of a metal layer.

According to another specific embodiment, the metal ions inserted into the electrochromic electrode material are lithium ions; the electrochromic electrode is made of $WO_3$ or $V_2O_5$; the electrolyte is made of lithium oxynitride, advantageously of lithium phosphorus oxynitride.

Advantageously, the electrochromic device according to the disclosure is an all-solid device.

According to a specific embodiment, it is a device successively comprising:
 a ceramic substrate, advantageously white-colored;
 a first current collector;
 a $LiV_2O_5$ electrochromic electrode;
 a LiPON electrolyte; and
 a second structured current collector.

The electrochromic device according to the present disclosure may be manufactured according to conventional techniques. Only the step of forming a second electrochromic electrode is suppressed.

The manufacturing method may in particular comprise the steps of:
 depositing a second current collector on a reflective substrate;
 depositing an electrolyte on the second current collector;
 depositing an electrochromic electrode on the electrolyte;
 depositing a first current collector on the electrochromic electrode.

According to another specific embodiment of the disclosure, the manufacturing method may especially comprise the steps of:
 depositing a first current collector on a reflective substrate;
 depositing an electrochromic electrode on the first current collector;
 depositing an electrolyte on the electrochromic electrode; and
 depositing a second current collector on the electrolyte.

The metal enabling the device to operate by insertion/deinsertion of metal ions is advantageously introduced during the deposition of the electrochromic electrode. According to another embodiment, it may also be introduced immediately after.

In the case of lithium, it may in particular be introduced by electrochemical lithiation; by dry Li metal evaporation lithiation; or by deposition by sputtering of a target with $Li_xWO_3$, for example. Such techniques may also be implemented in the case of sodium.

According to a specific embodiment, the substrate is made of electrically-conductive material and also plays the role of first or second current collector. In this case, the step of depositing the current collector in contact with the substrate is advantageously suppressed.

Techniques of deposition of layers forming the electrochromic device belong to the general knowledge of those skilled in the art. These are, in particular, PVD/CVD ("Physical Vapor Deposition" and "Chemical Vapor Deposition"), "spin coating", or sol-gel techniques, for example.

Further, it will be within the abilities of those skilled in the art to select the precursors adapted to each of the layers.

The present disclosure also relates to the use of this electrochromic device, particularly in the fields of thermal management by radiation in aerospace, for example, optical radiators of satellites.

As compared with prior art devices, the electrochromic device according to the disclosure enables to improve the optical contrast for the following reasons:
 the possibility of forming a metal layer between the electrochromic electrode and the electromagnetic radiation to which the device is submitted;
 the decrease, or even the suppression, of possible optical losses due to the absence of a second electrochromic electrode;
 the possibility of adapting the optical state of the device according to the material forming the single electrochromic electrode. In the absence of a metal layer formed by electrodeposition, it may be a transparent optical state when the material of the electrochromic electrode is a storage material such as $V_2O_5$. It may also be a colored (or absorbing) state when the material of the electrochromic electrode is a cathodic coloring material such as $WO_3$.

In practice, a satellite should adapt the quantity of energy that it absorbs (depending on the absorptivity of the wall materials) and the quantity of energy that it emits (depending on the emissivity) to maintain its internal temperature within a certain range, and this, whether it faces the sun or the cold of space.

Such a thermal management is made possible due to the electrochromic electrode according to the present disclosure having its reflective substrate advantageously facing the satellite.

When the satellite faces the sun, it absorbs the minimum possible energy (heat) to avoid burning. In parallel it emits any excess energy which may have been absorbed.

When the satellite faces the cold of space, it absorbs all the possible energy (heat) to increase its temperature. In parallel, it emits almost no energy to maintain its temperature.

Generally, the satellite portions exposed to sun (hot surface) correspond to the first functional state (no electrolyte) of the electrochromic device. In this case, the reflective substrate modulates the radiations, given that the other layers are transparent. The reflective substrate does not absorb radiations from the sun (wavelength range from 0.2 to 2 micrometers) for the following reasons:
 the stack is transparent;
 the absence of a second electrochromic electrode improves the transparency of the stack; and
 the substrate reflects almost all radiations.

Then, the device emits the entire energy absorbed in infrared (from 2 to 30 micrometers).

The satellite portions which are not exposed to sun (cold side) correspond to the second functional state (presence of an electrodeposit) of the electrochromic device. In this case, the electrodeposit modulates the radiations, given that it absorbs the few radiations which arrive nearby (wavelength from 0.2 to 2 micrometers). On the other hand, the electrodeposit emits lightly due to its metallic nature (all metals have a very low emissivity in infrared).

FIG. 1 shows an electrochromic device successively comprising:

a substrate (1) made of a material transparent in the infrared range. It may in particular be sapphire, $BaF_2$, ZnS, or ZnSe. It has a thickness advantageously in the order of 200 micrometers.

a second current collector (2) formed of a layer transparent in the infrared range. It may in particular be a metal inert with respect to the involved metal ions such as copper, nickel, tungsten, or molybdenum, particularly for lithium or sodium ions. Its thickness is advantageously smaller than 20 nanometers.

an electrolyte (3) made of a LiPON (lithium phosphorus oxynitride) layer, having a thickness advantageously in the range from 1 to 2 micrometers.

an electrochromic electrode (4), made of a material capable of storing lithium. It advantageously is an optically-active electrode made of tungsten oxide $WO_3$, which corresponds to material $Li_xWO_3$ when lithium is inserted. Its thickness may be in the order of 400 nanometers.

a first current collector (5) which may be made of transparent conductive oxide, for example, ITO. Its thickness is in the order of 200 nanometers.

According to this configuration, the substrate (1), which is in contact with the second current collector (2), is directly exposed to electromagnetic radiation.

When lithium is inserted into the material of the electrochromic electrode, the electrochromic device is called "absorbing", given that the different layers of material forming it are transparent to the radiation to which it is exposed. This absorbing state may in particular be obtained by application of an electric voltage in the order of 2 V between the terminals of the electrochromic device (current collectors).

Figure 2:
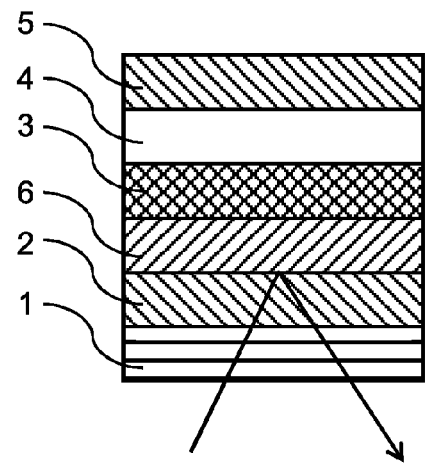
FIG. 2 illustrates the specific embodiment of FIG. 1 in its second functional state.

However, when lithium is not inserted into the material of the electrochromic electrode, the device is called "reflective", given that lithium forms a metal layer separating the electrolyte (3) from the second current collector (2). This reflective state is obtained by application of an electric voltage in the order of 4 V between the terminals of the electrochromic device (current collectors). Thus, the signal to which the electrochromic device is exposed is reflected by the metal layer (6) (second functional state, FIG. 2) formed by lithium electrodeposition.

It will be within the abilities of those skilled in the art to adjust the applied voltage according to the involved metal and to the desired thickness of the metal layer (6). This can thus provide a partial or total insertion or deinsertion of the metal.

As an example, an electric voltage of 2 V in insertion and 2.8 V in deinsertion in the case of lithium enables to obtain a metal layer sufficiently thick to ensure the reflective effect of the device.

Figure 3:
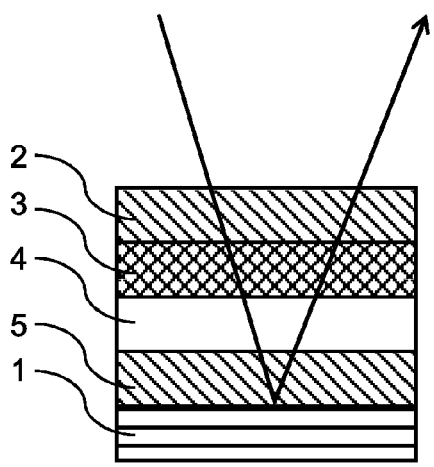
FIG. 3 illustrates an embodiment of the electrochromic device in its first functional state.

FIG. 3 shows an embodiment of the electrochromic device according to the present disclosure in its first functional state. This device comprises the stacking of:

a substrate (1) made of reflective material, advantageously of aluminum;

a first current collector (5) made of a material transparent in the infrared range. It may in particular be made of copper and have a 20-nanometer thickness. However, the presence of the first current collector is optional in the case where the substrate is made of electrically-conductive material, for example, of aluminum.

an electrochromic electrode (4). It advantageously is a passive electrode made of vanadium oxide $V_2O_5$, having a 200-nanometer thickness. Once the metal has been inserted, this material corresponds to lithiated oxide $Li_xV_2O_5$ in the case of lithium.

an electrolyte (3) advantageously made of a LiPON (lithium phosphorus oxynitride) layer, having a thickness which may range from 1 to 2 micrometers.

a second current collector (2) made of an electrically conductive material transparent in infrared and inert with respect to the involved metal ions. It may in particular be formed of a structured copper layer having a 50-nm thickness.

On application of a 1.5-V voltage across this device, lithium is inserted into the $Li_xV_2O_5$ material of the electrochromic electrode, which corresponds to the forming of the reflective state. The reflection is ensured by the aluminum substrate. It is the first functional state of the device.

Figure 4:
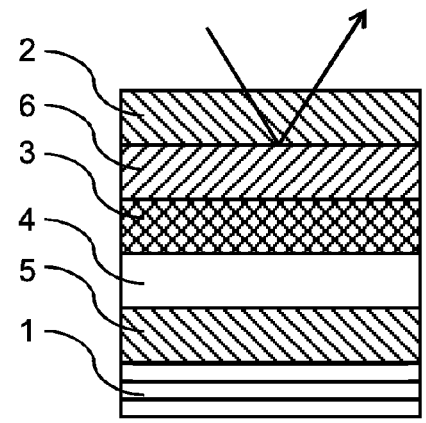
FIG. 4 illustrates the specific embodiment of FIG. 3 in its second functional state.

On application of a 3.5-V across this device, lithium is deinserted from the $Li_xV_2O_5$ material of the electrochromic electrode. It is then electrodeposited on the first current collector to form a metal lithium layer (6). It is the second functional state of the device (FIG. 4).

The application of a different voltage for the lithium insertion or deinsertion enables to adjust the thickness of the electrodeposited metal layer, and thus the absorbing effect of the device. For example, the deinsertion voltage may be in the order of 2.5 V.

In its initial state, that is, in the absence of an electrodeposited metal layer (6), the electrochromic device is reflective (signal input on the side of the first current collector). The reflection is integrally ensured by the substrate.

When lithium is deinserted, the reflection is ensured by the electrodeposited lithium layer. The device then is in its absorbing state. In this case, the electrodeposited metal layer is absorbing since it has been electrodeposited on a textured surface. The reflective state is ensured by the substrate while the absorbing state is ensured by the electrodeposited layer.

The invention claimed is:

1. An electrochromic device comprising:
   a stack successively comprising:
   (a) a first current collector;
   (b) an electrochromic electrode made of a material capable of reversibly inserting metal ions;
   (c) an electrolyte; and
   (d) a second current collector, and
   a reflective substrate in contact with the second current collector,
   wherein the device comprises a single electrochromic electrode and has at least the two following functional states:
   a first absorbing functional state, induced by the application of a first electric voltage between the two current collectors, wherein the device comprises metal ions reversibly inserted into the material of the electrochromic electrode; and
   a second reflective functional state, subsequent to the application of a second electric voltage between the two current collectors, wherein a metal layer is formed between the electrolyte and the second current collector, this metal layer comprising at least part of the metal ions initially reversibly inserted into the material of the electrochromic electrode.

2. The electrochromic device of claim 1, wherein the second current collector has a surface of contact with the electrolyte, having its surface state selected so that the metal layer formed at the interface between the electrolyte and the second current collector is absorbing.

3. The electrochromic device of claim 1, wherein said device has intermediate functional states between the first and second functional states, by the application of appropriate intermediate voltages between the first and second electric voltages.

4. The electrochromic device of claim 1, wherein the metal ions are selected from the group comprising: lithium ions; sodium ions; magnesium ions; silver ions; and mixtures thereof.

5. The electrochromic device of claim 1, wherein the metal layer has a thickness in the range from 10 to 1,000 nanometers.

6. The electrochromic device of claim 1, wherein the electrochromic electrode is made of a material selected from the group comprising: tungsten oxide $WO_3$; titanium oxides $TiO_x$; tantalum oxides $TaO_x$; molybdenum oxides $MoO_x$; niobium oxides $NbO_x$; vanadium oxide $V_2O_5$; $CeVO_4$; $CeO_2$; $CeO_2$—$SiO_2$; and mixtures of these materials.

7. The electrochromic electrode of claim 1, wherein materials forming the first and the second current collectors are, independently from each other, selected from the group comprising: copper; aluminum; indium tin oxide; aluminum zinc oxide; electrically-conductive transparent oxides; tungsten; molybdenum; titanium; and nickel.

8. The electrochromic device of claim 1, wherein the electrolyte is made of a material selected from the group comprising: lithium phosphorus oxynitride; $LiNbO_3$; $LiAlF_4$; $Li_3N$; lanthanum zinc tin oxide; lithium aluminum germanium phosphate; lithium silicon phosphorus oxynitride; lithium oxynitride; and lithium sulfur oxynitride.

9. The electrochromic device of claim 1, wherein the substrate is at least partially made of a material selected from the group comprising: glass; sapphire; ZnS; ZnSe; silicon; germanium; aluminum; carbon; polymer materials; mica; and ceramic.

10. The electrochromic device of claim 1, wherein the second current collector has a structured surface of contact with the electrolyte.

11. The electrochromic device of claim 1, wherein the electrochromic electrode, the electrolyte, and the current collectors are transparent.

12. The electrochromic device of claim 1,
wherein the metal ions inserted into the electrochromic electrode material are lithium ions;
wherein the electrochromic electrode is made of $WO_3$ or $V_2O_5$;
and wherein the electrolyte is made of lithium oxynitride.

13. The electrochromic device of claim 1, wherein:
the metal ions inserted into the electrochromic electrode material are lithium ions,
the electrochromic electrode is made of WO3 or V2O5; and
the electrolyte is made of lithium phosphorus oxynitride.

14. The electrochromic device of claim 1, wherein the metal layer has a thickness in the range from 100 to 500 nanometers.

15. An electrochromic device, wherein said device successively comprises:
a ceramic substrate;
a first current collector;
an $LiV_2O_5$ electrochromic electrode;
a LiPON electrolyte; and
a second structured current collector,
wherein the device comprises a single electrochromic electrode and has at least the two following functional states:
a first absorbing functional state, induced by the application of a first electric voltage between the two current collectors, wherein the device comprises metal ions reversibly inserted into the material of the electrochromic electrode; and
a second reflective functional state, subsequent to the application of a second electric voltage between the two current collectors, wherein a metal layer is formed between the electrolyte and the second current collector, this metal layer comprising at least part of the metal ions initially reversibly inserted into the material of the electrochromic electrode.

* * * * *